(12) United States Patent
Di Bari

(10) Patent No.: US 11,564,533 B2
(45) Date of Patent: Jan. 31, 2023

(54) APPARATUS FOR PREPARING A FOAM FROM A LIQUID, PARTICULARLY A FOOD LIQUID, SUCH AS MILK OR A MILK-BASED LIQUID

(71) Applicant: LUIGI LAVAZZA S.P.A., Turin (IT)

(72) Inventor: Sergio Di Bari, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 516 days.

(21) Appl. No.: 16/465,260

(22) PCT Filed: Dec. 1, 2017

(86) PCT No.: PCT/IB2017/057563
§ 371 (c)(1),
(2) Date: May 30, 2019

(87) PCT Pub. No.: WO2018/100543
PCT Pub. Date: Jun. 7, 2018

(65) Prior Publication Data
US 2019/0335952 A1 Nov. 7, 2019

(30) Foreign Application Priority Data
Dec. 1, 2016 (IT) .................... 102016000122005

(51) Int. Cl.
*A47J 43/07* (2006.01)
*A47J 36/16* (2006.01)
(Continued)

(52) U.S. Cl.
CPC ......... *A47J 43/0722* (2013.01); *A47J 36/165* (2013.01); *A47J 36/2483* (2013.01); *A47J 43/0465* (2013.01)

(58) Field of Classification Search
CPC .... A47J 27/004; A47J 36/165; A47J 36/2483; A47J 43/0465; A47J 43/0722
(Continued)

(56) References Cited

U.S. PATENT DOCUMENTS 5,720,552 A * 2/1998 Schindlegger .......... A47J 43/27
366/314
5,882,113 A * 3/1999 Binder ................... B01F 33/453
366/314
(Continued)

FOREIGN PATENT DOCUMENTS

CN 103356085 A 10/2013
CN 203263141 U 11/2013
(Continued)

OTHER PUBLICATIONS

Written Opinion for PCT/IB2017/057563 dated Mar. 16, 2018.
(Continued)

*Primary Examiner* — Ibrahime A Abraham
*Assistant Examiner* — Frederick F Calvetti
(74) *Attorney, Agent, or Firm* — Sughrue Mion, PLLC

(57) ABSTRACT

An apparatus for preparing a foam from a liquid, particularly a food liquid, such as milk or a milk-based liquid. The apparatus (10) includes a base body (16) provided with electrical connection means (52, 54) and an upper unit (12, 14) arranged to be releasably placed on the base body (16) to be electrically connected to the base body (16) through the electrical connection means (52, 54). The upper unit (12, 14) has an upper body (12) acting as a vessel and an intermediate body (14) separate from each other. The upper body (12) houses a stirring member (24). The intermediate body (14) houses electrically operated driver (42, 44, 46) for driving the stirring member (24) to rotate and a heating element (40) for heating the liquid contained in the upper body (12).

8 Claims, 2 Drawing Sheets

(51) Int. Cl.
*A47J 36/24* (2006.01)
*A47J 43/046* (2006.01)

(58) Field of Classification Search
USPC .......................................................... 99/453
See application file for complete search history.

(56) References Cited

U.S. PATENT DOCUMENTS

| | | | | |
|---|---|---|---|---|
| 6,712,497 | B2 * | 3/2004 | Jersey | A47J 43/0465 366/274 |
| 6,796,220 | B2 * | 9/2004 | Lee | A47J 43/046 99/337 |
| 7,314,307 | B2 * | 1/2008 | Cai | A47J 43/0727 366/273 |
| 7,669,517 | B2 * | 3/2010 | Boussemart | B01F 27/093 366/144 |
| 7,800,022 | B2 * | 9/2010 | Kim | A47J 27/004 99/348 |
| 7,878,702 | B2 * | 2/2011 | Peng | A47J 27/004 366/205 |
| 8,480,292 | B2 * | 7/2013 | Dushine | A23L 2/39 366/314 |
| 8,668,376 | B2 * | 3/2014 | Krauchi | A47J 43/0465 366/274 |
| 9,039,274 | B1 * | 5/2015 | Corda | A47J 43/046 366/199 |
| 9,060,650 | B2 * | 6/2015 | De' Longhi | A47J 36/165 |
| 9,089,238 | B2 * | 7/2015 | Lin | A47J 27/004 |
| 9,357,882 | B2 * | 6/2016 | Chen | B01F 23/2351 |
| 9,364,806 | B2 * | 6/2016 | King | A47J 36/2411 |
| 9,801,500 | B2 * | 10/2017 | Ven Der Woning | A47J 43/0465 |
| 2005/0105387 | A1 * | 5/2005 | Nikkhah | A47J 43/042 220/717 |
| 2011/0024537 | A1 * | 2/2011 | Gonzalez | A47J 43/046 215/11.1 |
| 2012/0291637 | A1 * | 11/2012 | Yu | A47J 43/0465 99/453 |
| 2013/0186286 | A1 * | 7/2013 | De' Longhi | A47J 43/082 99/453 |
| 2013/0200064 | A1 * | 8/2013 | Alexander | H02J 7/00302 219/441 |
| 2014/0047985 | A1 * | 2/2014 | Chen | B01F 33/4535 99/453 |
| 2014/0247686 | A1 * | 9/2014 | Arnett | A47J 43/0772 366/205 |
| 2015/0013552 | A1 * | 1/2015 | Tsang | B01F 33/4535 99/453 |
| 2015/0320262 | A1 * | 11/2015 | Stefanoni | A01J 11/16 99/287 |
| 2017/0333916 | A1 * | 11/2017 | Kamees | B04B 5/10 |
| 2018/0146826 | A1 * | 5/2018 | Mizrahi | A47J 43/042 |
| 2018/0199760 | A1 * | 7/2018 | Rai | A47J 43/0465 |
| 2018/0310770 | A1 * | 11/2018 | Ven Der Woning | A47J 43/1093 |
| 2018/0368621 | A1 * | 12/2018 | Helf | A47J 27/004 |
| 2019/0021548 | A1 * | 1/2019 | Eisner | A61J 11/04 |
| 2019/0231122 | A1 * | 8/2019 | Hanneken | A47J 36/2438 |
| 2020/0113387 | A1 * | 4/2020 | Ven Der Woning | A47J 43/0465 |
| 2020/0390286 | A1 * | 12/2020 | Pamplin | A47J 43/075 |
| 2021/0121840 | A1 * | 4/2021 | Pamplin | B01F 33/5011 |

FOREIGN PATENT DOCUMENTS

| | | |
|---|---|---|
| CN | 203987593 U | 12/2014 |
| CN | 203987723 U | 12/2014 |
| EP | 2 526 844 A1 | 11/2012 |
| FR | 201200323 Y | 3/2009 |
| FR | 2 930 883 A1 | 11/2009 |
| FR | 202234926 U | 5/2012 |
| WO | 2009/135759 A1 | 11/2009 |
| WO | 2013/033996 A1 | 3/2013 |

OTHER PUBLICATIONS

International Search Report for PCT/IB2017/057563 dated Mar. 16, 2018.

Communication dated Aug. 16, 2021, from the China National Intellectual Property Administration in application No. 201780073644.5.

* cited by examiner

APPARATUS FOR PREPARING A FOAM FROM A LIQUID, PARTICULARLY A FOOD LIQUID, SUCH AS MILK OR A MILK-BASED LIQUID

CROSS REFERENCE TO RELATED APPLICATIONS

This application is a National Stage of International Application No. PCT/IB2017/057563 filed Dec. 1, 2017, claiming priority based on Italian Patent Application No. 102016000122005 filed Dec. 1, 2016.

BACKGROUND OF THE INVENTION

Field of the Invention

The present invention relates to a so-called "milk frother" apparatus, that is to say an apparatus for preparing a foam from a liquid, in particular from a food liquid, such as milk or a milk-based liquid.

Background

An apparatus of this type typically comprises a support base provided with electrical supply means, a vessel for containing an amount of liquid, a heating element for heating the liquid contained in the vessel during the preparation of the foam, a stirring member arranged to be removably mounted in the vessel to rotate about an axis of rotation, electrically operated driving means (typically an electric motor) for driving the stirring member to rotate about the aforementioned axis of rotation in order to agitate the liquid contained in the vessel and thus making the foam, and user interface means for enabling the user to control the apparatus.

A milk frother apparatus is typically available in two different configurations, namely a configuration with an integrated vessel and a configuration with a separate vessel.

According to the first known configuration (integrated vessel), all the components of the apparatus, with the exception of the support base, form a single unit. In this case, therefore, the apparatus comprises a support base and an upper unit which is arranged to be placed on the support base and comprises both a vessel and a heating element electrically powered by the support base when the upper unit is mounted on the support base. Such a configuration allows a good heat exchange between the vessel and the heating element, but makes it difficult to wash the vessel, whether under running water or in a dishwashing machine, due to the presence of electrical contacts in the upper unit.

According to the other known configuration (separate vessel), the vessel is a component distinct from the rest of the apparatus, in particular distinct from the electrical/electronic part of the apparatus. In the operating condition, the vessel rests on a base unit comprising the support base, the heating element, the electric motor and the user interface. The user may however separate the vessel from the base unit, for example, to pour out the obtained foam or to wash the vessel. Such a configuration makes it particularly easy to wash the vessel, as the vessel may be separated from the rest of the apparatus. On the other hand, the heat exchange between the vessel and the heating element is not as good as the configuration with an integrated vessel, since the vessel is no longer in direct contact with the heating element.

A milk frother apparatus is known from EP 2 526 844 A1.

It is an object of the present invention to provide an apparatus for preparing a foam from a liquid, particularly a food liquid, such as milk or a milk-based liquid, which allows the advantages of the two known configurations described above to be combined, i.e. which ensures a high heat exchange between the vessel and the heating element and at the same time allows the vessel to be separated from the electrical/electronic part of the apparatus, for example to allow the vessel to be washed in a dishwashing machine.

This and other objects are fully achieved according to the present invention by virtue of an apparatus having the features specified in independent claim 1. Advantageous embodiments of the invention form the subject-matter of the dependent claims.

SUMMARY OF THE INVENTION

In short, the invention is based on the idea of making the apparatus in three main parts which may be separated from one another, namely
- an upper body acting as a vessel for containing an amount of liquid to be frothed,
- an intermediate body provided with heating means and electrically operated driving means for driving a stirrer arranged inside the vessel to rotate, and
- a base body provided with electrical connection means for connection to a power supply and for connection to the intermediate body, wherein the upper body includes a cylindrical shaped main portion, open at its top, and a coupling portion, also having a cylindrical shape, which is placed underneath the main portion and communicates therewith, wherein the intermediate body is configured to be supported, in an operating condition of the apparatus, on the base body so as to be electrically connected to the base body by the aforesaid electrical connection means and to be separable from the base body, wherein the intermediate body has on its top a seat for receiving the coupling portion of the upper body, wherein the upper body and the intermediate body are provided with releasable coupling means for coupling the vessel to the intermediate body when the coupling portion of the upper body is inserted into the relative seat provided in the intermediate body, and wherein the aforesaid heating means are arranged around the seat provided in the intermediate body.

By virtue of the fact that the upper body is separable from the rest of the apparatus, in particular from the electrical/electronic part of the apparatus, washing the vessel in a dishwashing machine is easier. Moreover, by virtue of the fact that the upper body and the intermediate body are coupled with one another by inserting a coupling portion of the upper body into a respective seat of the intermediate body and that the heating means are arranged around that seat, the contact surface between these two components of the apparatus is increased with respect to the case of simple contact of the upper body on the base of the apparatus (as in the known solution of the apparatus with separate vessel), and consequently the heat exchange between the heating means and the upper body is increased. An apparatus according to the invention thus succeeds in combining the advantages of the two known configurations mentioned above.

Preferably, the coupling means are threaded coupling means including an external thread provided on the coupling portion of the upper body and a mating internal thread provided in the seat of the intermediate body.

According to an embodiment, the heating means include an electrical resistor having a spiral shape that follows the internal thread of the seat provided in the intermediate body.

BRIEF DESCRIPTION OF THE DRAWINGS

Further features and advantages of the present invention will become more evident from the following detailed description, given purely by way of non-limiting example with reference to the accompanying drawings, wherein.

DETAILED DESCRIPTION OF THE INVENTION

Figure 2:
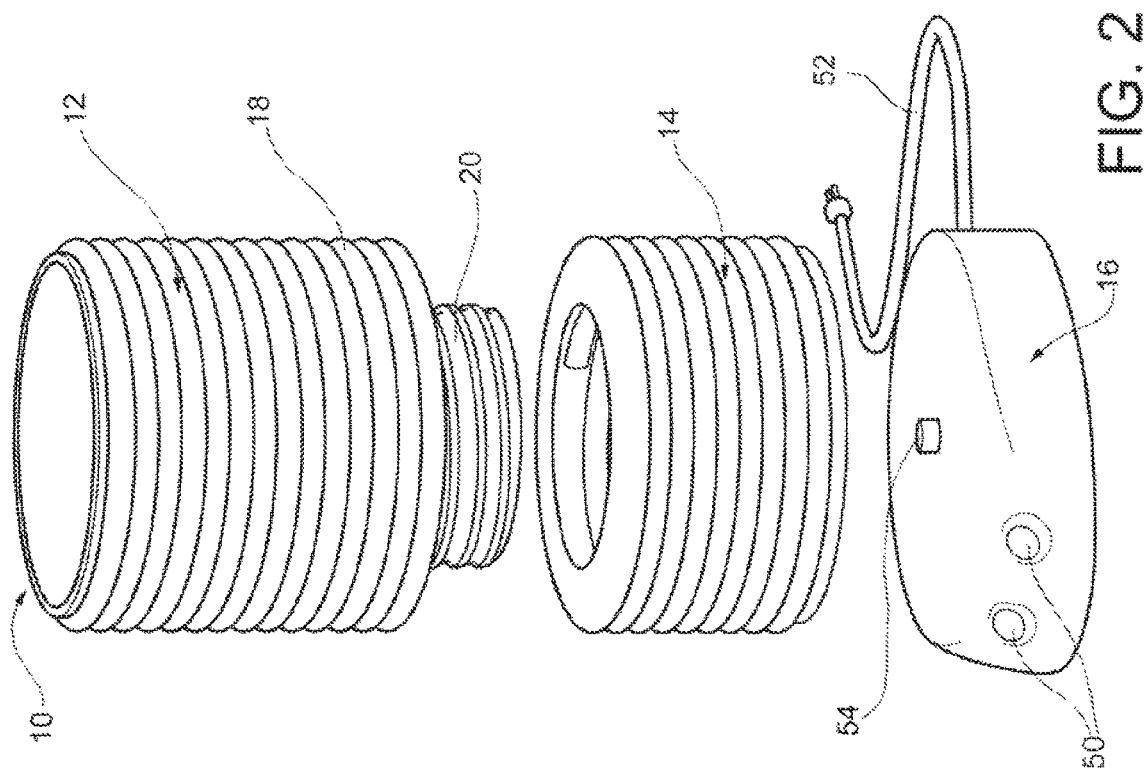
FIG. 2 is a perspective view of the apparatus of FIG. 1, with the three main parts of the apparatus separated from one another.

With reference to the drawings, an apparatus according to the invention, to be used for preparing a foam from a food liquid, such as milk or a milk-based liquid, for the preparation of drinks, such as cappuccino, latte macchiato, hot chocolate, etc. is generally indicated at 10.

The apparatus 10 basically comprises the following three main parts: an upper body 12 acting as a vessel (hereinafter referred to as "vessel 12") arranged to contain an amount of food liquid to be frothed, an intermediate body 14 and a base body 16.

The vessel 12 includes a cylindrical-shaped main portion 18, open at its top, and a coupling portion 20, also having a cylindrical shape, which is placed underneath the main portion 18 and communicates therewith.

The vessel 12 may be provided, at an upper edge of the main portion 18, with a pouring spout (not present in the embodiment shown in the drawings). The vessel 12 may also be conveniently provided with a handle, as well as a removable lid for closing the upper opening tightly. Neither the handle nor the lid are, for the sake of simplicity, shown in the drawings.

Preferably, the vessel 12 is made of a material permeable to the magnetic field.

Figure 3:
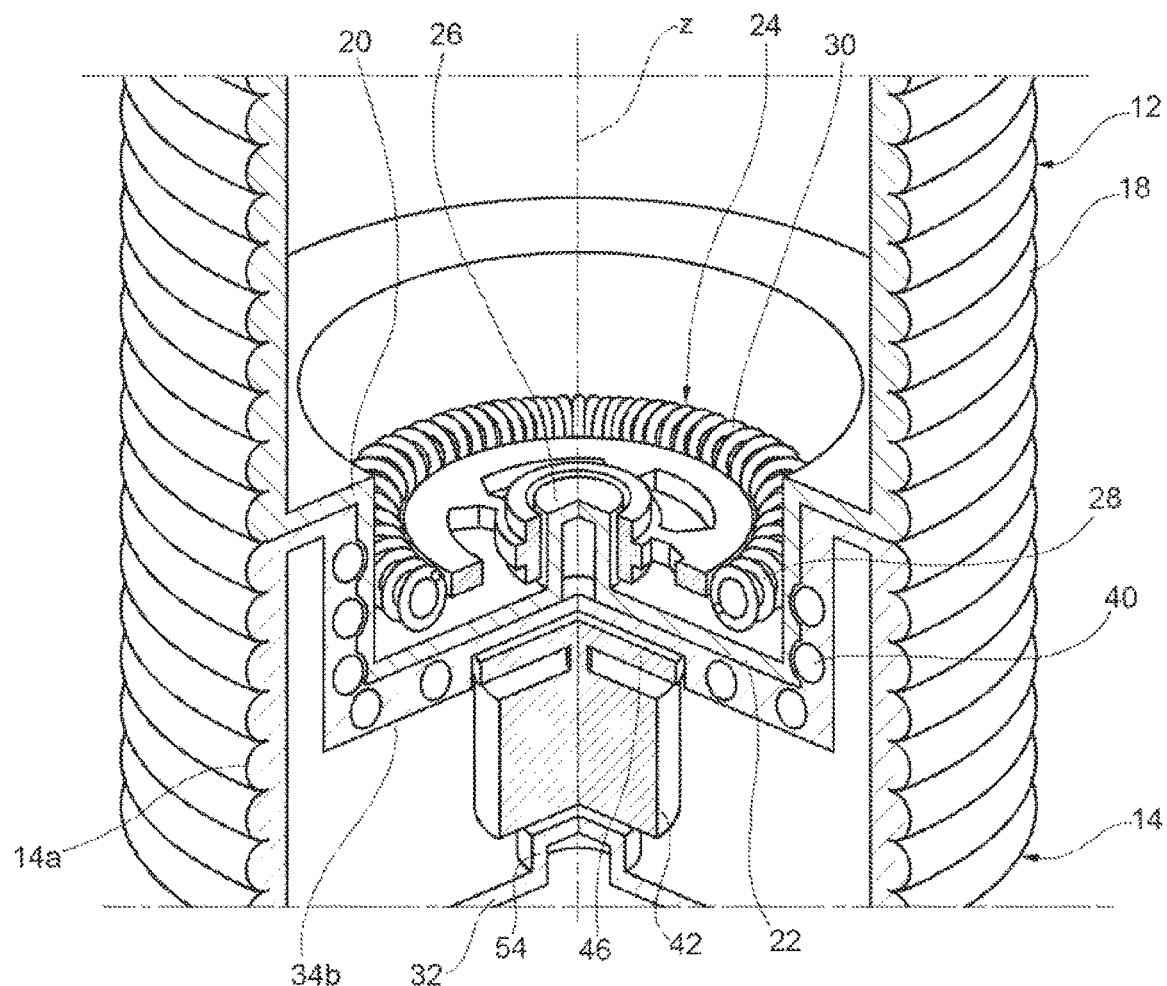
FIG. 3 shows a cutaway view of the apparatus of FIG. 1, in the coupling area between the upper body and the intermediate body.
Figure 4:
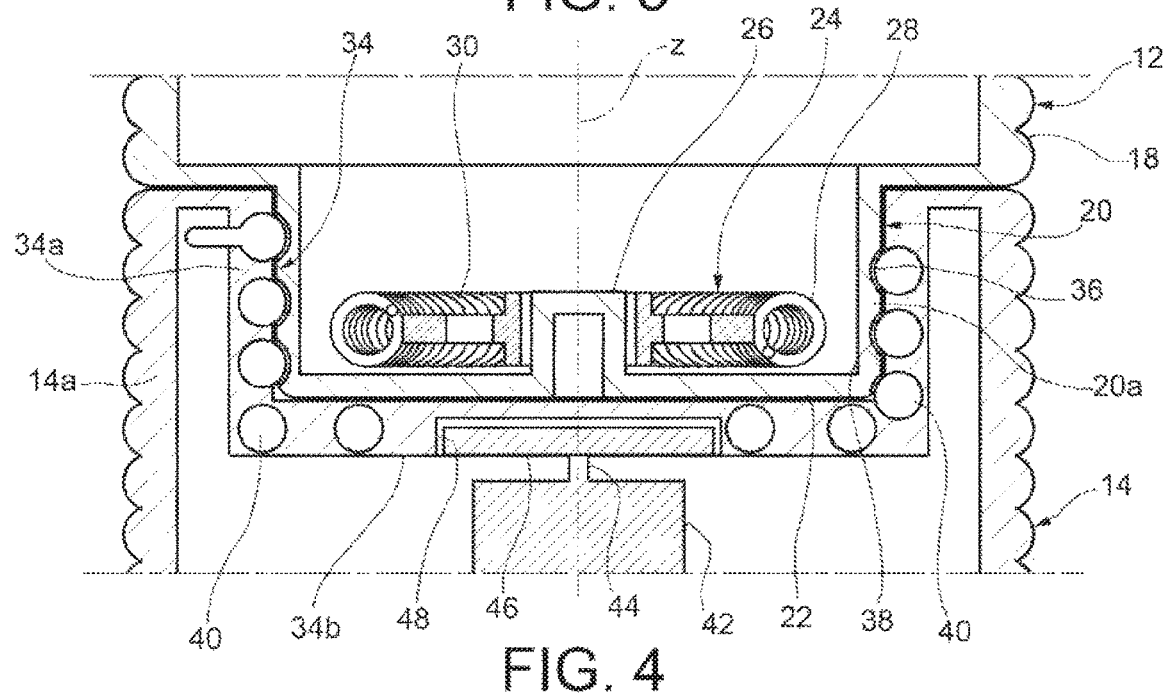
FIG. 4 is an axial sectional view of the apparatus of FIG. 1, which shows on an enlarged scale the coupling area between the upper body and the intermediate body.

As shown in FIGS. 3 and 4, inside the vessel 12, and more specifically on a bottom wall 22 of the coupling portion 20, a stirring member, generally indicated at 24, is removably mounted. In the embodiment proposed herein, the stirring member 24 has an overall annular configuration and is preferably mounted around a pin-like portion 26 placed in the center of the bottom wall 22 of the coupling portion 20 and projecting upwards from that wall. The stirring member 24 is able to rotate about an axis of rotation z. In the embodiment illustrated in the drawings, the axis of rotation z is defined by the pin-like portion 26 and coincides with the axis of symmetry of the vessel 12. In the operating condition of the apparatus, the axis of rotation z extends in an essentially vertical direction.

The stirring member 24 is of a type known per se. Preferably, the stirring member 24 comprises a radially outer annular element 28, which is provided with permanent magnets and essentially acts as a permanent magnet rotor of an electric motor. The stirring member 24 further comprises stirring means which in the illustrated embodiment comprise a spiral 30 of metal or plastic wire, which is closed in a circular ring, is arranged inside the annular element 28 and is fixed to that element. The stirring member 24 may, however, be provided with stirring means having other shapes/configurations, for example fins, vanes, filamentary appendages, etc., which do not necessarily extend inside the annular element 28.

The intermediate body 14 is a cylindrical body preferably having an outer diameter substantially coinciding with the outer diameter of the main portion 18 of the vessel 12. The intermediate body 14 has a substantially flat bottom wall 32. The intermediate body 14 has at its top a cylindrical seat 34 arranged to receive the coupling portion 20 of the vessel 12. The seat 34 is defined by a cylindrical side wall 34a arranged coaxially to, and inside, a side wall 14a of the intermediate body 14, as well as by a substantially flat bottom wall 34b.

The vessel 12 and the intermediate body 14 are provided with releasable coupling means arranged to allow these two main parts of the apparatus 10 to be coupled in a releasable manner when the coupling portion of the vessel 12 is inserted into the seat 34 of the intermediate body 14. By virtue of these releasable coupling means, the vessel 12 and the intermediate body 14 are normally coupled with one another to form a single body. If necessary, for example when the vessel 12 is to be washed, the vessel 12 may be easily separated from the intermediate body. According to an embodiment, these coupling means are threaded coupling means and comprise an external thread 36 provided on the coupling portion 20 of the vessel 12, and more specifically on a cylindrical lateral wall 20a of that portion, and a mating internal thread 38 provided in the seat 34 of the intermediate body 14, and more specifically on the cylindrical side wall 34a of the seat 34.

Inside the intermediate body 14 there is provided a heating element 40, formed for example by an electrical resistor, for heating the vessel and therefore the liquid contained therein. The heating element 40 is arranged around the seat 34, in the vicinity of, or in contact with, the side wall 34a. Preferably, the heating element 40 is further arranged in the vicinity of, or in contact with, the bottom wall 34b. According to the illustrated embodiment, the heating element 40 has a spiral shape which follows the inner thread 38 of the seat 34.

The intermediate body 14 further houses electrically operated driving means for driving the stirring member 24 to rotate about the axis of rotation z. In the illustrated embodiment, these driving means comprise an electric motor 42 arranged to drive a drive shaft 44 to rotate about the axis of rotation z and a magnetic structure 46 fixed to the drive shaft 44 so as to rotate therewith about the axis of rotation z. The magnetic structure 46 may be magnetically coupled with the stirring member 24 through the bottom wall 34b of the seat 34 of the intermediate body 14 and through the bottom wall 22 of the coupling portion 20 of the vessel 12. Preferably, the magnetic structure 46 is received in a special slot 48 provided on the lower face of the bottom wall 34b of the seat 34. In this way, the magnetic structure 46 is made to rotate by the electric motor 42 about the axis of rotation z and generates a rotating magnetic field which, interacting with the permanent magnets of the stirring member 24, induces a rotation of that member about the axis of rotation z.

Figure 1:
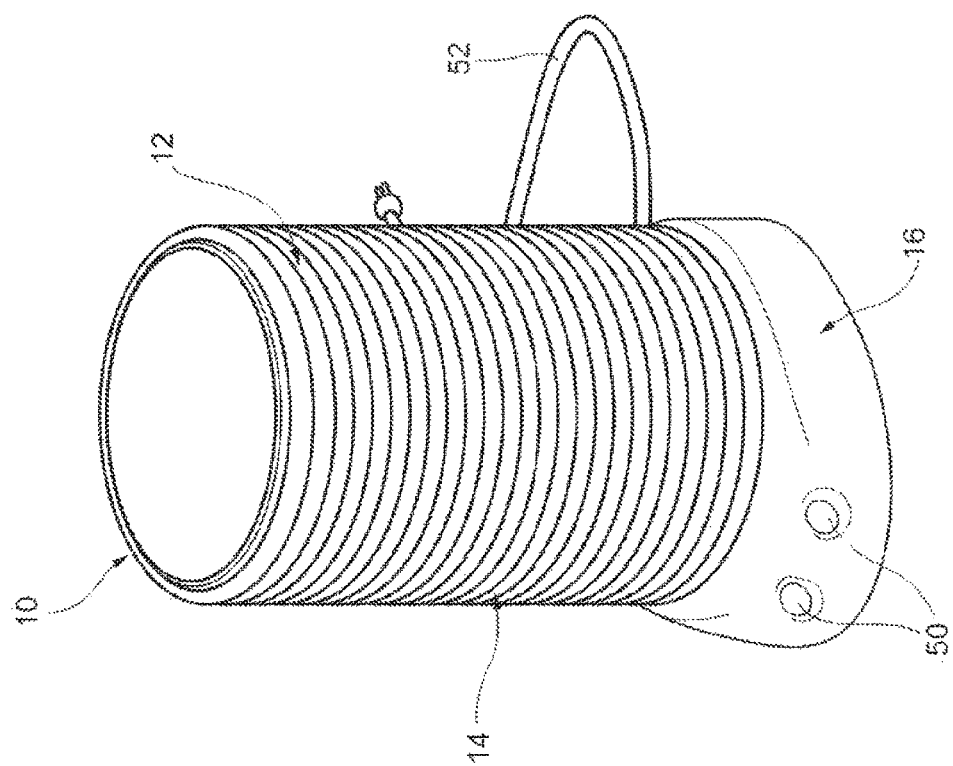
FIG. 1 is a perspective view of an apparatus for preparing a foam from a liquid, particularly from a food liquid, such as milk or a milk-based liquid, according to an embodiment of the present invention.

The base body 16 is provided with user interface means for enabling the user to control the apparatus. In the illustrated embodiment (see in particular FIGS. 1 and 2), such user interface means comprise a pair of buttons 50 operable by the user. Such user interface means might alternatively include a different number of buttons and/or a screen (such as for example a touchscreen). According to a variant embodiment of the invention (not shown), the interface means are provided on the intermediate body 14, rather than on the base body 16.

The base body 16 is also provided, in a manner known per se, with an electric cable 52 which is connectable to a power supply, as well as with electrical connection means (for example a connecting pin 54) for the electrical connection of the base body 16 with the intermediate body 14, so as to allow the heating element 40 and the electric motor 42 contained in the intermediate body 14 to be powered.

As is evident from the description provided above, an apparatus according to the invention allows to combine the advantage of a high heat exchange between the heating element and the liquid contained in the vessel, by virtue of the fact that the vessel is inserted with its coupling portion into the seat of the intermediate body around which the heating element is arranged, with the advantage of a vessel that is easy to wash, by virtue of the fact that the vessel may be separated from the intermediate body, and therefore from the electrical/electronic part of the device.

Naturally, the principle of the invention remaining unchanged, the embodiments and the constructional details may vary widely with respect to those described and illustrated purely by way of non-limiting example, without thereby departing from the scope of the invention as defined in the appended claims.

The invention claimed is:

1. An apparatus (10) for preparing a foam from a food liquid, which is selected from the group consisting of milk and milk-based liquids, comprising
   a base body (16) provided with electrical connection means (52, 54), and
   an upper unit (12, 14) arranged to be releasably placed on the base body (16) to be electrically connected to the base body (16) through said electrical connection means (52, 54),
   wherein the upper unit (12, 14) comprises:
      a vessel (12) for containing an amount of liquid,
      a stirring member (24) detachably mounted inside the vessel (12) and arranged to be driven to rotate about an axis of rotation (z),
      heating means (40) for heating the liquid contained in the vessel (12), and
      electrically operated driving means (42, 44, 46) for driving the stirring member (24) to rotate about said axis of rotation (z),
   wherein the upper unit (12, 14) comprises an upper body (12) and an intermediate body (14) separate from each other,
   wherein the upper body (12) acts as a vessel and includes a main portion (18) of cylindrical shape, which is open at its top, and the intermediate body (14) houses said heating means (40) and said electrically operated driving means (42, 44, 46),
   wherein the upper body (12) further includes a coupling portion (20) of cylindrical shape, which is placed underneath the main portion (18) and communicates therewith, the coupling portion having a bottom wall (22),
   wherein the intermediate body (14) has at its top a seat (34) for receiving the coupling portion (20) of the upper body (12), the seat being defined by a cylindrical side wall (34a) and a substantially flat bottom wall (34b),
   wherein the upper body (12) and the intermediate body (14) are provided with releasable coupling means (36, 38) for coupling the upper body (12) with the intermediate body (14) when the coupling portion (20) of the upper body (12) is inserted into the seat (34) of the intermediate body (14), and
   wherein said heating means (40) are arranged around the seat (34) of the intermediate body (14).

2. The apparatus according to claim 1, wherein said coupling means (36, 38) are threaded coupling means including an external thread (36) provided on the coupling portion (20) of the upper body (12) and a mating internal thread (38) provided in the seat (34) of the intermediate body (14).

3. The apparatus according to claim 1, wherein said heating means (40) include an electrical resistor.

4. The apparatus according to claim 3, wherein said electrical resistor (40) has a spiral shape extending along a line following the internal thread (38) of the seat (34) of the intermediate body (14).

5. The apparatus according to claim 1, further comprising user interface means (50) for allowing control of the apparatus by the user.

6. The apparatus according to claim 5, wherein said user interface means (50) are provided on the intermediate body (14) or on the base body (16).

7. An apparatus (10) for preparing a foam from a food liquid, which is selected from the group consisting of milk and milk-based liquids, consisting of:
   a base body (16) provided with electrical connection means (52, 54), and
   an upper unit (12, 14) arranged to be releasably placed on the base body (16) to be electrically connected to the base body (16) through said electrical connection means (52, 54),
   wherein the upper unit (12, 14) comprises
      a vessel (12) for containing an amount of liquid,
      a stirring member (24) detachably mounted inside the vessel (12) and arranged to be driven to rotate about an axis of rotation (z),
      heating means (40) for heating the liquid contained in the vessel (12), and
      electrically operated driving means (42, 44, 46) for driving the stirring member (24) to rotate about said axis of rotation (z),
   wherein the upper unit (12, 14) comprises an upper body (12) and an intermediate body (14) separate from each other,
   wherein the upper body (12) acts as a vessel and includes a main portion (18) of cylindrical shape, which is open at its top, and the intermediate body (14) houses said heating means (40) and said electrically operated driving means (42, 44, 46),
   wherein the upper body (12) further includes a coupling portion (20) of cylindrical shape, which is placed underneath the main portion (18) and communicates therewith, the coupling portion having a bottom wall (22),
   wherein the intermediate body (14) has at its top a seat (34) for receiving the coupling portion (20) of the upper body (12), the seat being defined by a cylindrical side wall (34a) and a substantially flat bottom wall (34b),
   wherein the upper body (12) and the intermediate body (14) are provided with releasable coupling means (36, 38) for coupling the upper body (12) with the intermediate body (14) when the coupling portion (20) of the upper body (12) is inserted into the seat (34) of the intermediate body (14), and wherein said heating means (40) are arranged around the seat (34) of the intermediate body (14).

8. The apparatus according to claim 1, wherein the intermediate body (14) houses electrically operated driving means for driving the stirring member (24) to rotate about an axis of rotation (z) and comprising an electric motor (42) arranged to drive a drive shaft (44) to rotate about the axis of rotation (z) and a magnetic structure (46) fixed to the drive shaft (44) so as to rotate therewith about the axis of rotation (z), wherein the magnetic structure (46) is magnetically coupled with the stirring member (24) through a bottom wall (34*b*) of a seat (34) of the intermediate body (14) and through a bottom wall (22) of the coupling portion (20) of the vessel (12), and wherein the magnetic structure (46) generates a rotating magnetic field which, interacting with permanent magnets of the stirring member (24), induces a rotation of said stirring member (24) about the axis of rotation (z).

\* \* \* \* \*